(12) United States Patent
Burchard et al.

(10) Patent No.: US 9,223,010 B2
(45) Date of Patent: Dec. 29, 2015

(54) RECEIVER COMPENSATION BY ADJUSTING RECEIVER SENSITIVITY

(71) Applicant: ELMOS SEMICONDUCTOR AG, Dortmund (DE)

(72) Inventors: Bernd Burchard, Essen (DE); Juergen Larm, Dortmund (DE)

(73) Assignee: Elmos Semiconductor AG, Dortmund (DE)

( * ) Notice: Subject to any disclaimer, the term of this patent is extended or adjusted under 35 U.S.C. 154(b) by 102 days.

(21) Appl. No.: 14/178,365

(22) Filed: Feb. 12, 2014

(65) Prior Publication Data

US 2014/0233685 A1    Aug. 21, 2014

(30) Foreign Application Priority Data

Feb. 12, 2013    (DE) .......................... 10 2013 002 676

(51) Int. Cl.
    *G01R 35/00*    (2006.01)
    *G01S 7/497*    (2006.01)
(52) U.S. Cl.
    CPC ..................................... *G01S 7/497* (2013.01)
(58) Field of Classification Search
    CPC ... H01B 15/00; G01J 2005/0048; G01J 3/524
    USPC ........................ 250/214 R, 214.1, 221, 559.1;
                                        348/302–311; 327/514, 515
    See application file for complete search history.

(56) References Cited

U.S. PATENT DOCUMENTS

| 5,059,877 | A | 10/1991 | Teder |
| 6,384,379 | B1 | 5/2002 | Reime |
| 6,828,546 | B2 | 12/2004 | Reime |
| 6,888,571 | B1 * | 5/2005 | Koshizuka et al. ........... 348/302 |
| 6,953,926 | B2 | 10/2005 | Reime |
| 7,378,641 | B2 | 5/2008 | Melcher et al. |
| 7,589,303 | B2 | 9/2009 | Reime et al. |
| 8,405,821 | B2 | 3/2013 | Reime |
| 2013/0181613 | A1 | 7/2013 | Schweninger |

FOREIGN PATENT DOCUMENTS

| DE | 198 39 730 C1 | 3/2000 |
| DE | 100 01 955 A1 | 7/2001 |
| DE | 100 24 156 A1 | 11/2001 |
| DE | 103 46 741 B3 | 3/2005 |
| DE | 10 2004 025 345 B3 | 11/2005 |
| DE | 10 2005 010 745 B3 | 4/2006 |
| DE | 10 2007 005 187 A1 | 9/2008 |
| EP | 2 418 512 A1 | 2/2012 |

* cited by examiner

*Primary Examiner* — Que T Le
(74) *Attorney, Agent, or Firm* — Bejin Bieneman PLC

(57) ABSTRACT

A receiver compensation system and method to operate the receiver compensation system are disclosed. The compensation sensor system includes at least one receiver and at least one control loop. The method to operate the receiver compensation system is characterized in that the receiver is adjusted in its sensitivity by a control signal such that in the case of changes of an input received by the receiver, a control signal of the control loop resets an associated receiver output signal, except for a control error. Further, at least one other signal of the control loop represents or contains a measurement of the change of the input received by the receiver.

16 Claims, 14 Drawing Sheets

RECEIVER COMPENSATION BY ADJUSTING RECEIVER SENSITIVITY

CROSS-REFERENCE TO RELATED APPLICATIONS

The present invention claims priority under 35 USC 119 based on German patent application no. 10 2013 002 676.8, filed on Feb. 12, 2013. The entire subject matter of this priority document, including specification, claims and drawings thereof, is incorporated by reference herein.

BACKGROUND OF THE INVENTION

1. Field of the Invention

The present invention relates to compensating sensor systems and methods for compensating such systems.

2. Description of the Background Art

Compensating sensor systems are known, for example, from U.S. Pat. No. 6,828,546B2, U.S. Pat. No. 6,953,926B2, U.S. Pat. No. 6,384,379B1, U.S. Pat. No. 7,589,303B2, U.S. Pat. No. 7,378,641B2, WO2006094751A1 and U.S. Pat. No. 8,405,821B2. It is a significant problem of the state of the art to compensate sensor systems wherein the receiver sensitivity is not independent of the operating point of the system.

Depending on the operating point, the sensitivity might become very small or even zero. In the case of employing a photodiode as a sensor, the illumination with sunlight might lead to an over-modulation such that no usable signal can be generated by the sensor.

The present invention has been made in order to overcome the drawbacks of existing compensating sensor systems. Accordingly, it is an object of the present invention to describe a compensating sensor system that shows no over modulation within a certain operating range.

SUMMARY OF THE INVENTION

For the purpose of solving the above-mentioned problems, the present invention according to a first aspect thereof provides a method to operate a compensation sensor system comprising at least one receiver D and at least one control loop. The method is characterized in that the at least one receiver D is adjusted in its sensitivity by a control signal S3 such that, in the case of changes of a physical value received by the receiver D, the control signal S3 of the control loop resets at least one associated receiver output signal S1, except for a control error. Physical value, as used herein, refers to one of a strength of a light signal and a strength of a magnetic field. The method is further characterized in that at least a control signal S4 of the control loop represents or contains a measurement of the change of the physical value.

According to a second aspect of the invention, in addition to the first aspect, the method is characterized in that the at least one receiver D is a photodiode.

According to a third aspect of the invention, in addition to the first aspect, the method is characterized in that the at least one receiver D is a hall sensor.

According to a fourth aspect of the invention, in addition to the first aspect, the method is characterized in that the at least one receiver D comprises an interconnection of multiple receivers which may be connected and disconnected to receive the input, depending on the at least one control signal S3.

According to a fifth aspect of the invention, in addition to the first aspect, the method is characterized in that at least one transmitter H1 irradiates at least one transmitter signal S5 to the at least one receiver D. A feedback control of an absolute receiver sensitivity of the receiver compensates via the first control signal S3 the irradiation of the transmitter H1 in such that the at least one receiver output signal S1 contains, except for a control error signal and system noise, no remaining portion of the transmitter signal S5.

According to a sixth aspect of the invention, in addition to the fifth aspect, the method is characterized in that a differential receiver sensitivity of the at least one receiver D is measured by at the least one transmitter signal S5.

According to a seventh aspect of the invention, in addition to the sixth aspect, the method is characterized in that the at least one control loop includes first and second control loops, and the second control loop keeps the differential receiver sensitivity constant except for another control error.

According to an eight aspect of the invention, in addition to the first aspect, the method is characterized in that at least one compensation transmitter K irradiates at least one additional compensation transmitter signal S3b in the at least one receiver D. An additional control loop and the at least one additional control signal S3b control this compensation transmitter. The control signal S3b depends on the at least one receiver output signal S1.

According to a ninth aspect of the invention, a compensated sensor system includes at least one receiver D and at least one control loop. The at least one receiver D is adjusted in its sensitivity. In case of changes of a physical value received by the receiver D, the control loop resets at least one related receiver output signal S1, except for a control error, using at least a first control signal S3. Further, at least one other control signal S4 of the control loop represents or contains a measurement of the change of the physical value.

According to a tenth aspect of the invention, in addition to the ninth aspect, the compensated sensor system is characterized in that the at least one receiver D is adjusted in its sensitivity by the at least one control signal S3 such that, in the case of changes of a physical value received by the receiver D, the at least one control signal S3 of the at least one control loop resets the at least one associated receiver output signal S1, except for a control error, and the at least one other control signal S4 of the control loop represents or contains a measurement of the change of the physical value.

According to an eleventh aspect, the invention provides a method to operate a compensation sensor system comprising at least one receiver and at least one control loop. The method includes the steps of receiving a variable receiver input signal at a first level by the receiver, adjusting the sensitivity of the receiver via a first control signal such that a receiver output signal is at an initial receiver output signal value, receiving the variable receiver input signal at a second level by the receiver, the second level being different from the first level, and readjusting the sensitivity of the receiver via the first control signal such that the receiver output signal is again adjusted to the initial receiver output signal value, except for a control error. A control loop output signal contains or represents a measurement of a difference between the first level and the second level of the variable receiver input signal.

According to a twelfth aspect of the invention, in addition to the eleventh aspect, the method is characterized in that the at least one receiver is a photodiode.

According to a thirteenth aspect of the invention, in addition to the eleventh aspect, the method is characterized in that the at least one receiver is a hall sensor.

According to a fourteenth aspect of the invention, in addition to the eleventh aspect, the method is characterized in that the at least one receiver comprises an interconnection of multiple sub-receivers. The multiple sub-receivers are configured to be connected and disconnected in order to adjust the sensitivity of the receiver, and are connected and disconnected according to the first control signal.

According to a fifteenth aspect, in addition to the eleventh aspect, the method is characterized in that a transmitter generates the variable receiver input signal based on a transmitter input signal. The method is further characterized in that an absolute receiver sensitivity of the receiver compensates, via the first control signal, the variable receiver input signal such that the receiver output signal contains no remaining portion of the variable receiver input signal except for the control error and system noise.

According to a sixteenth aspect, in addition to the fifteenth aspect, the method is characterized in that a differential receiver sensitivity of the receiver is measured by the transmitter input signal.

According to a seventeenth aspect, in addition to the sixteenth aspect, the method is characterized in that the at least one control loop includes first and second control loops, and the second control loop keeps the differential receiver sensitivity constant except for another control error.

According to an eighteenth aspect, in addition to the eleventh aspect, the method is characterized in that the at least one compensation transmitter irradiates a compensating receiver input signal into the receiver based on a compensation transmitter input signal, an additional, independent control loop controls the compensation transmitter via the compensation transmitter input signal, and the compensation transmitter input signal depends on the receiver output signal.

DETAILED DESCRIPTION OF ILLUSTRATIVE EMBODIMENTS

Figure 1:
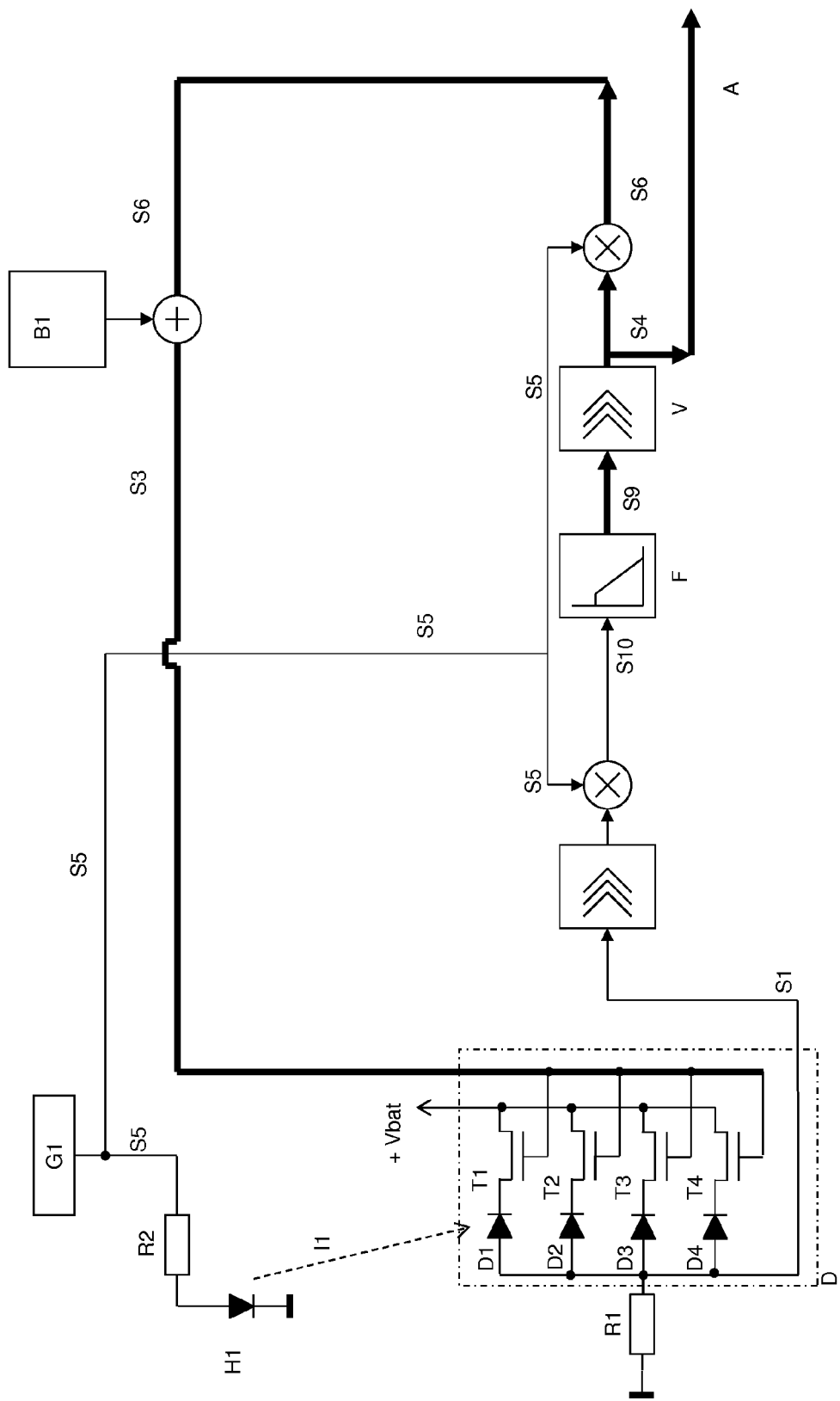
FIG. 1 is a schematic of a first illustrative embodiment of the invention.

FIG. 1 schematically shows an exemplary embodiment of a compensation sensor system according to the invention. It should be understood that only those structures considered necessary for clarifying the present invention are described herein. Other conventional structures, and those of ancillary and auxiliary components of the system will be known and understood to those skilled in the art.

A generator G1 supplies a signal S5 to be provided as an input to a transmitter H1. The signal S5 is preferably band limited with an upper frequency limit $f_{max}$, a middle frequency $f_0$ and a lower frequency limit $f_{min}$. The relation $f_{min} > (f_{max}-f_{min})/2$ shall be valid. Here the input of the signal S5 takes place via a series resistor R2. Other drive systems for inputting a signal to the transmitter also fall within the scope of the invention. The transmitter H1 transmits into a first transmission channel I1.

The transmission channel I1 terminates at the receiver D. The sensitivity of the receiver D is controllable. A stepwise photodiode array is illustrated here as an example. The exemplary stepwise controllable photodiode array consists of four separate segments D1 to D4. The number of four photodiodes is here and in the following sections only exemplary. The controllable receiver delivers a receiver output signal S1 to the first input stage of a primary signal path.

The signal S1 may be filtered and/or amplified if required by the first input stage. Alternatively, the first input stage may be skipped. For ease of understanding we assume in the following sections that the amplification of the first input stage is 1 and that no filtering is performed in this stage.

A multiplier multiplies the signal S1 with the transmitter signal S5 to generate the signal S10. Subsequently a filter F filters the signal S10 to generate the filtered signal S9. Typically, the filter F is a low pass filter. The upper filter frequency is chosen such that all frequencies above $f_{filter}$ inclusively are suppressed. The filter frequency $f_{filter}$ is set to be lower than the frequency $f_{min}$ of the transmitter signal S5 and larger than $(f_{max}-f_{min})/2$. The amplifier V amplifies the resulting signal S9 and generates the amplified signal S4. The physical value may be one of a strength of a light signal and a strength of a magnetic field received by the receiver D. A second multiplier multiplies the signal S4 with the signal S5 to generate the signal S6. An offset B1 may be added to the signal S6 to achieve the signal S3. The signal S3 is used to control the sensitivity of the controllable receiver.

In the example of FIG. 1 the signals S4, S6 and S3 are digital signals in the form of buses. Accordingly, their values are expressed as digital numbers. In the present exemplary embodiment the signal S3 controls the sensitivity of the photodiode array consisting of diodes D1 to D4 such that an electronic switch (here a transistor) T1 to T4 is assigned to each photodiode. The electronic switch connects or disconnects the respective photodiode to the power supply Vbat depending on the corresponding bit value of the feedback signal of the signal bus S3.

For an operating system it is useful, for example, if the photodiode D2 has double the size of photodiode D1. Further, D3 may be twice as large as D2 and D4 may be twice as large as D3. Obviously, additional photodiodes may be used. In this case the bus width of the signals S3, S6 and S4 must be adapted correspondingly. The number of switches T1 to T4 must be adapted as well.

In the embodiment of FIG. 1, the sense resistor R1 provides a ground connection for the current through the photodiodes. The receiver output signal is developed as a voltage across this sense resistor R1.

This base construction shows a compensation of the transmitter signal S5 by adjusting the sensitivity control of the receiver. To obtain a stable control loop the amplifications must be chosen correspondingly. If required, parasitic components, which might cause phase shifts etc., must be taken into account. In the simplest case an amplification of −1 is applicable. If the control loop works correctly the system will remain in the same operating point of the receiver D with respect to S1. This statement regarding the operating point refers to active sensor elements only. In this embodiment, the active sensor elements are a subset of the set of diodes D1 to D4.

Figure 2:
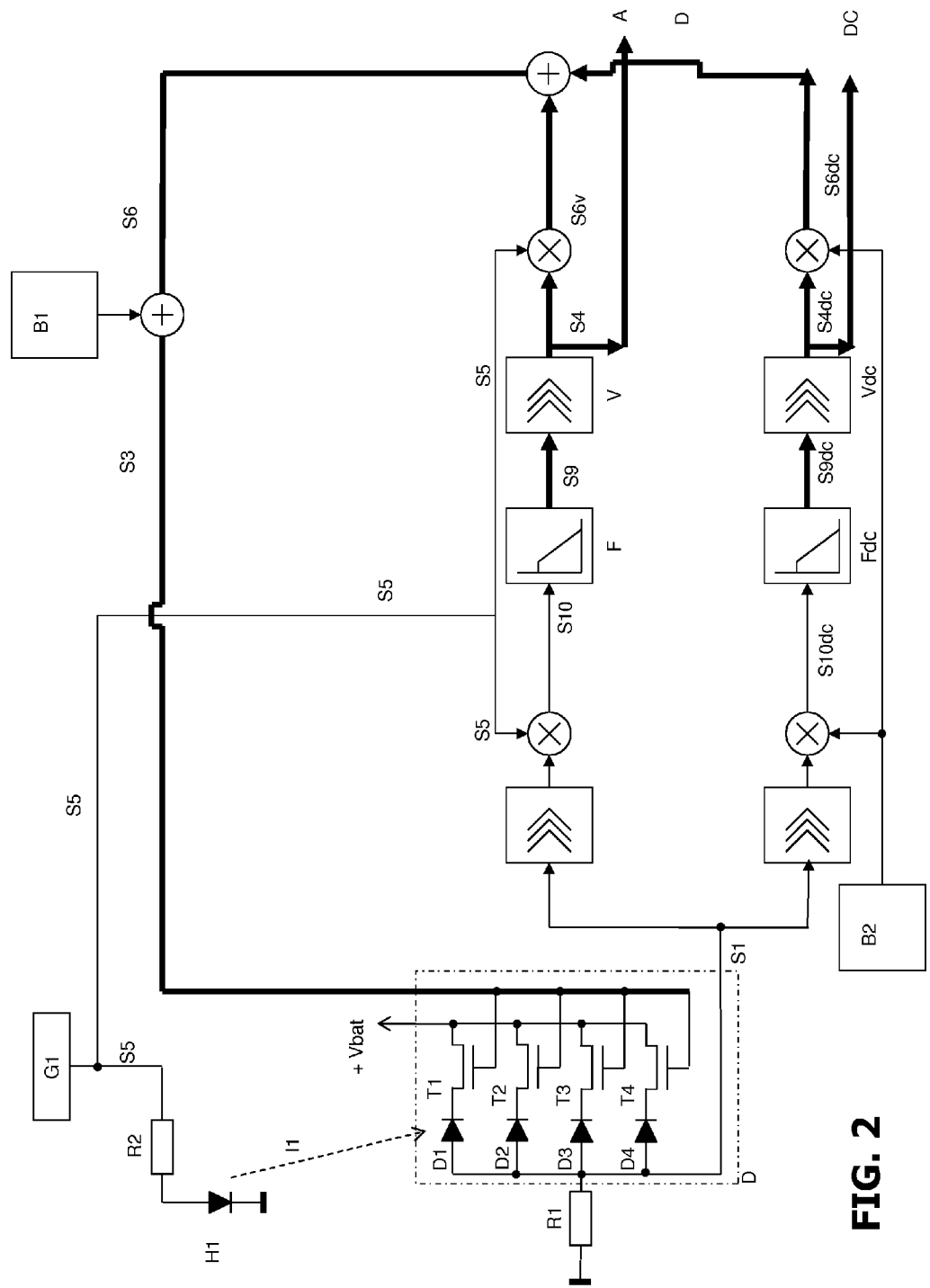
FIG. 2 is a schematic of a second illustrative embodiment of the invention.

Because large signal disturbances might be a significant problem it is useful to compensate these disturbances separately. For example, such a large signal distortion might be caused by illumination with sunlight. FIG. 2 shows such an extension of the embodiment of the system illustrated in FIG. 1. The signal S1 is additionally amplified and multiplied with a constant B2 in a secondary signal path. Here, the constant B2 represents a model signal that simulates a jamming input. Because sunlight is a quasi-DC-value the signal B2 is also a DC-value in this example. In the case of a suitable dimensioning we might choose B2 to be B2=1 for the example of sunlight compensation. In this case the multiplier is not required. This, however, is not possible in conjunction with other jamming inputs.

The filter Fdc filters the resulting signal S10dc. Typically this filter has the same properties as the filter F in the primary signal path. Subsequently the amplifier Vdc amplifies the signal S9dc to generate the signal S4dc. Thereafter the signal S4dc is multiplied with the signal B2. In this embodiment, B2 is a constant.

As before, the multiplication might be skipped if B2=1 is valid. The resulting signal S6dc is added to the corresponding signal S6v of the primary signal path, which is related to the signal S5. Thereafter, after the addition of the constant B1, the resultant signal S3 is input to the receiver as discussed above.

Figure 3:
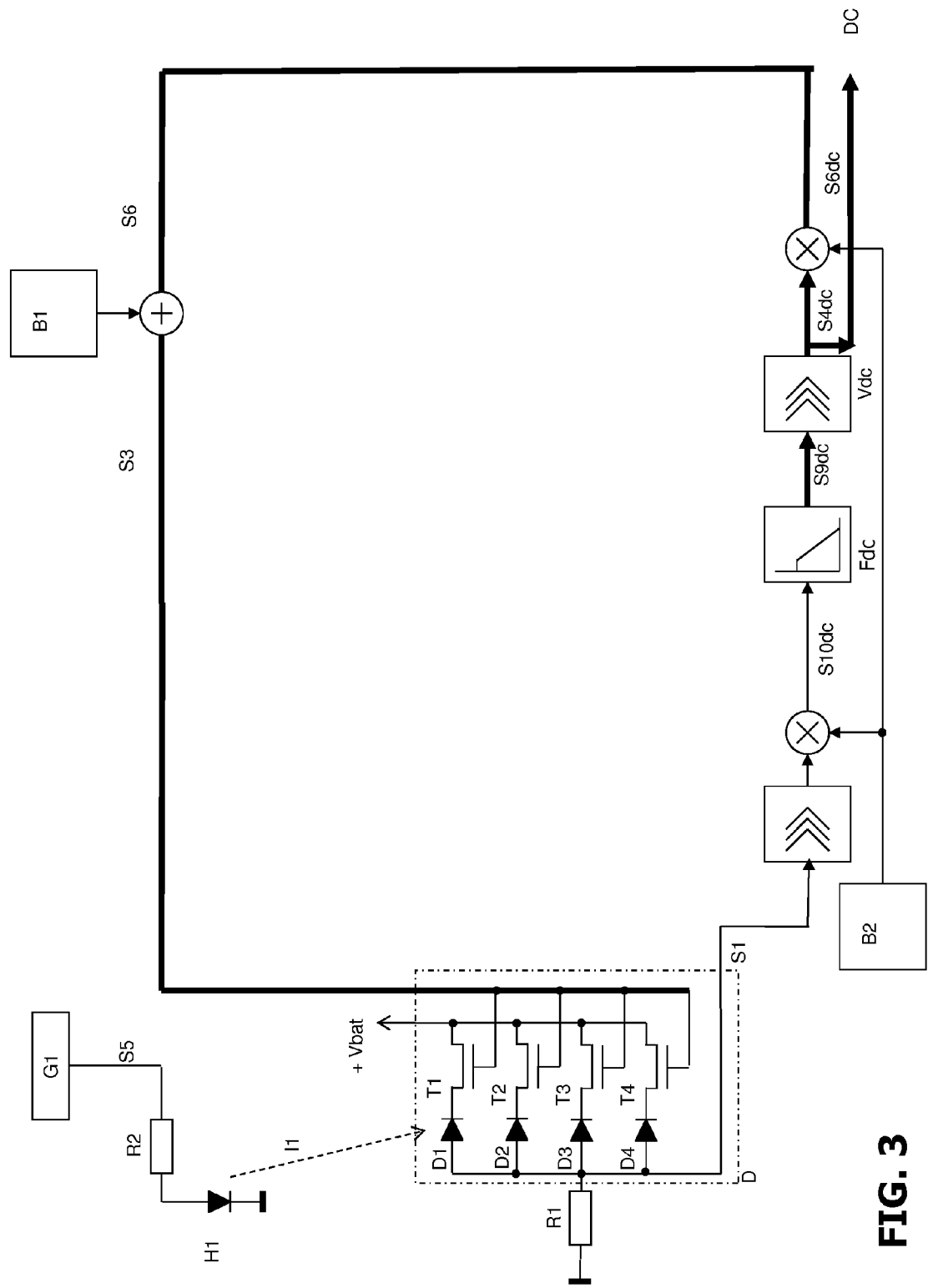
FIG. 3 is a schematic of a third illustrative embodiment of the invention.

There are application cases with an unknown transmitter signal S5. FIG. 3 illustrates such a case. Compensation is possible in these cases as well. It is important, that in these cases the filter F and the source B2 should be chosen in such a way that the signal S5 to be received is not compensated. The filter F must block the signal S5. The signal B2 should not contain the frequency range of interest for S5 in order to avoid the generation of disturbances.

Figure 4:
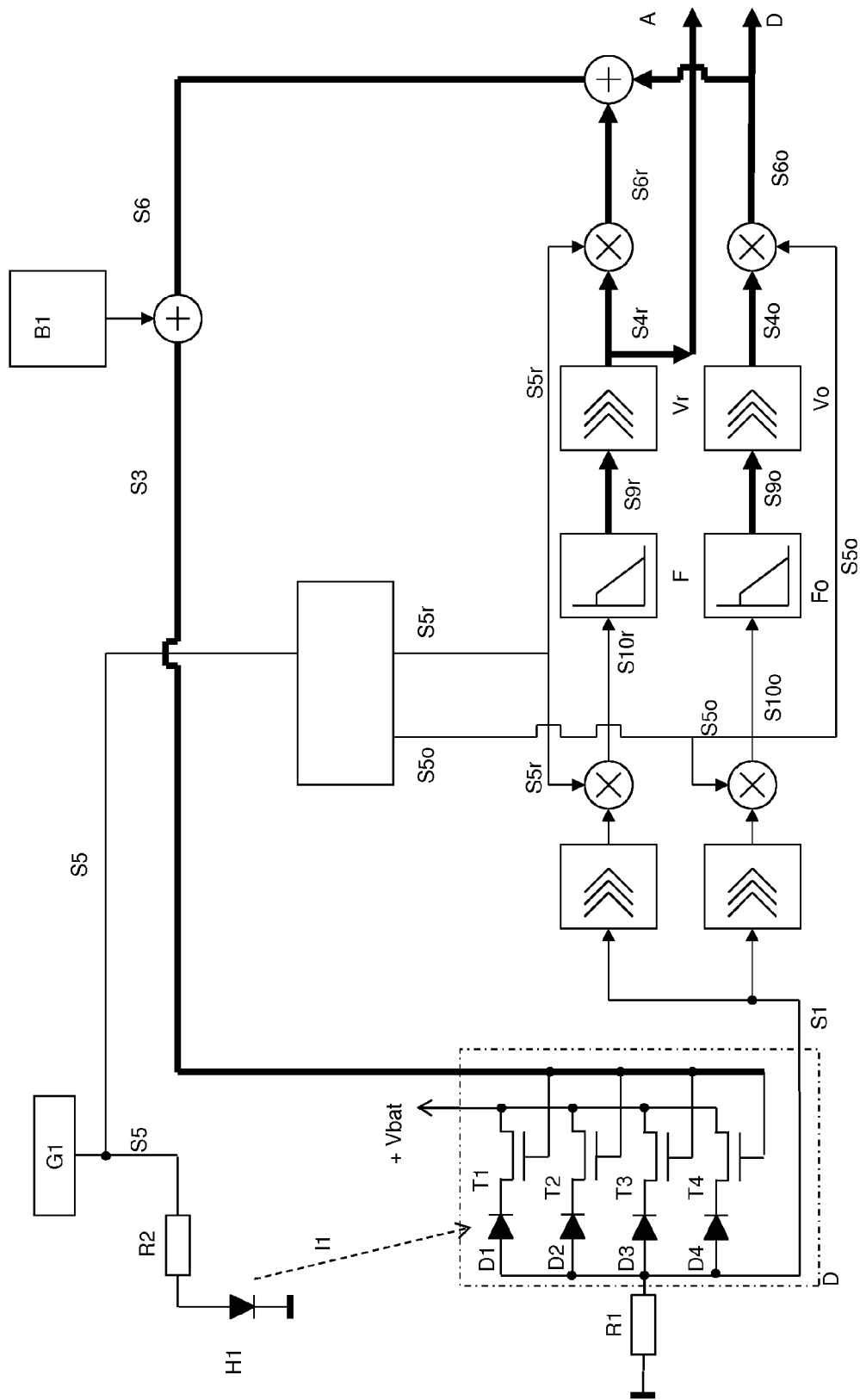
FIG. 4 is a schematic of a fourth illustrative embodiment of the invention.

Based on the compensation technology as illustrated in FIG. 1 time of flight measurements are possible. (FIG. 4) The system generates two orthogonal signals S5o and S5r. Orthogonal means that the product of the signals S5r*S5o is removed in each of the typically equal linear filters F and Fo in FIG. 4.

Figure 5:
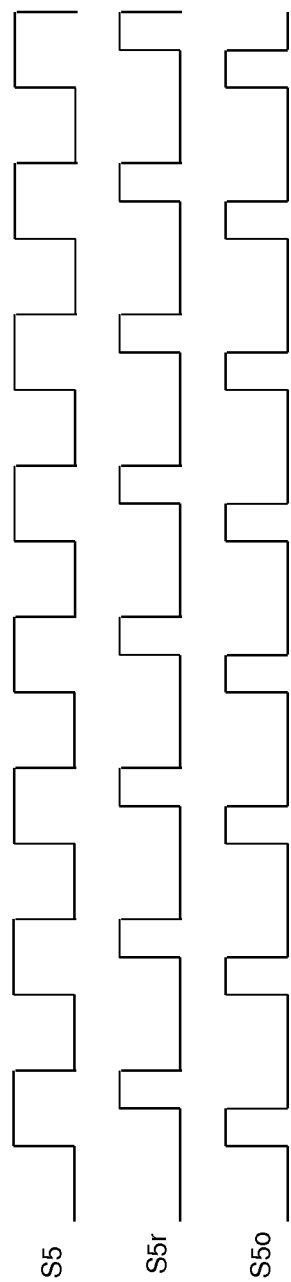
FIG. 5 is a timing diagram for clarification of orthogonality as it applies to embodiments of the invention.

FIG. 5 illustrates exemplary suitable signals S5o and S5r for a corresponding S5 signal. Depending on the delay of the S5 signal in the transmission channel I1, the signal portion of S6o is changed.

Figure 6:
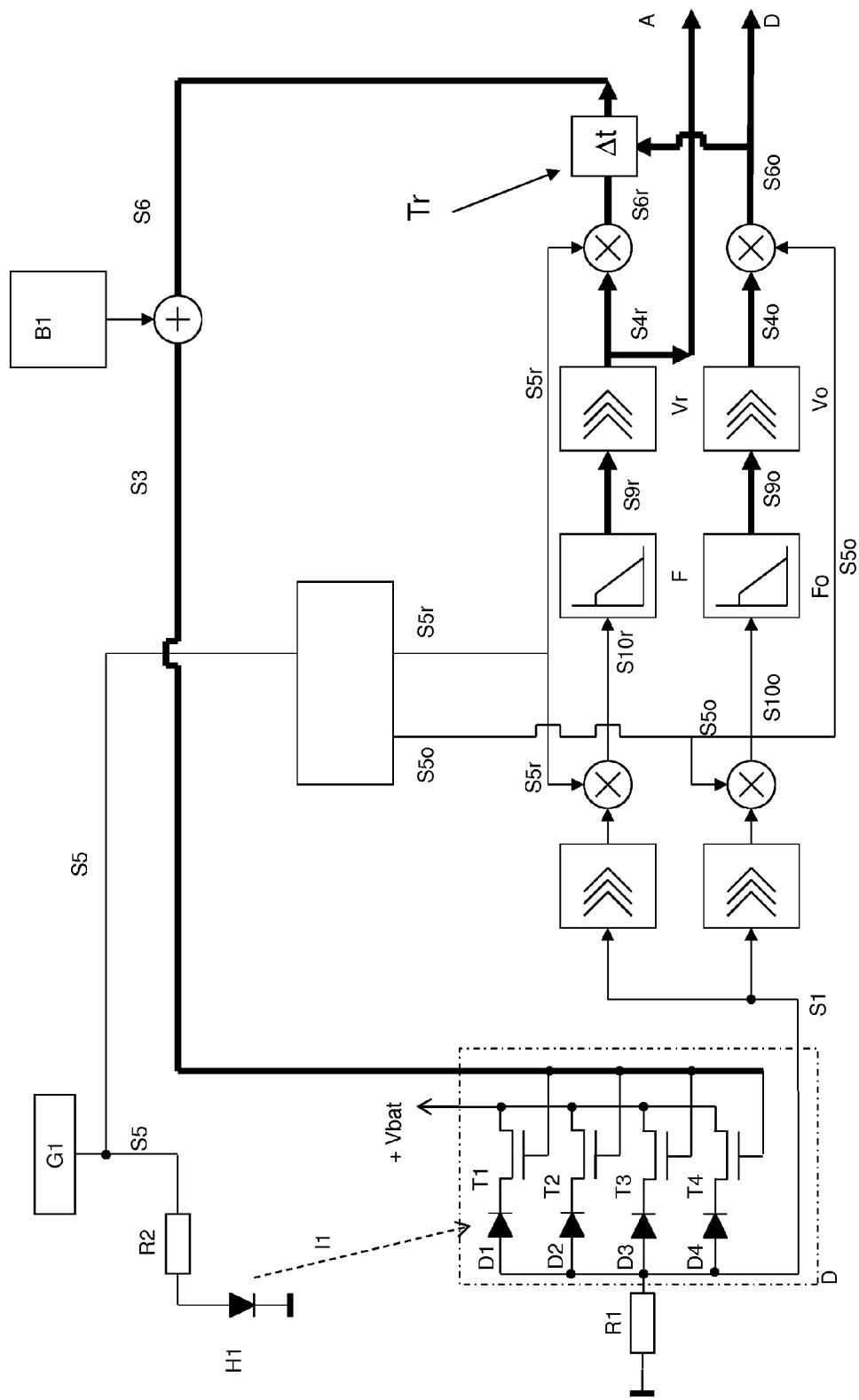
FIG. 6 is a schematic of a fifth illustrative embodiment of the invention.

A direct control regarding amplitude and phase is illustrated in the embodiment as shown in FIG. 6. In contrast to the embodiment of FIG. 4, the additional block TR regulates the compensator signal delay. The signal S6o controls that regulation. This subsequent regulation is performed in such a way that it is negatively proportional to the value of signal S6o. The delay of block TR becomes larger as the magnitude of signal S6o becomes smaller. In contrast to this the signal S6r regulates only the amplitude compensation.

Figure 7:
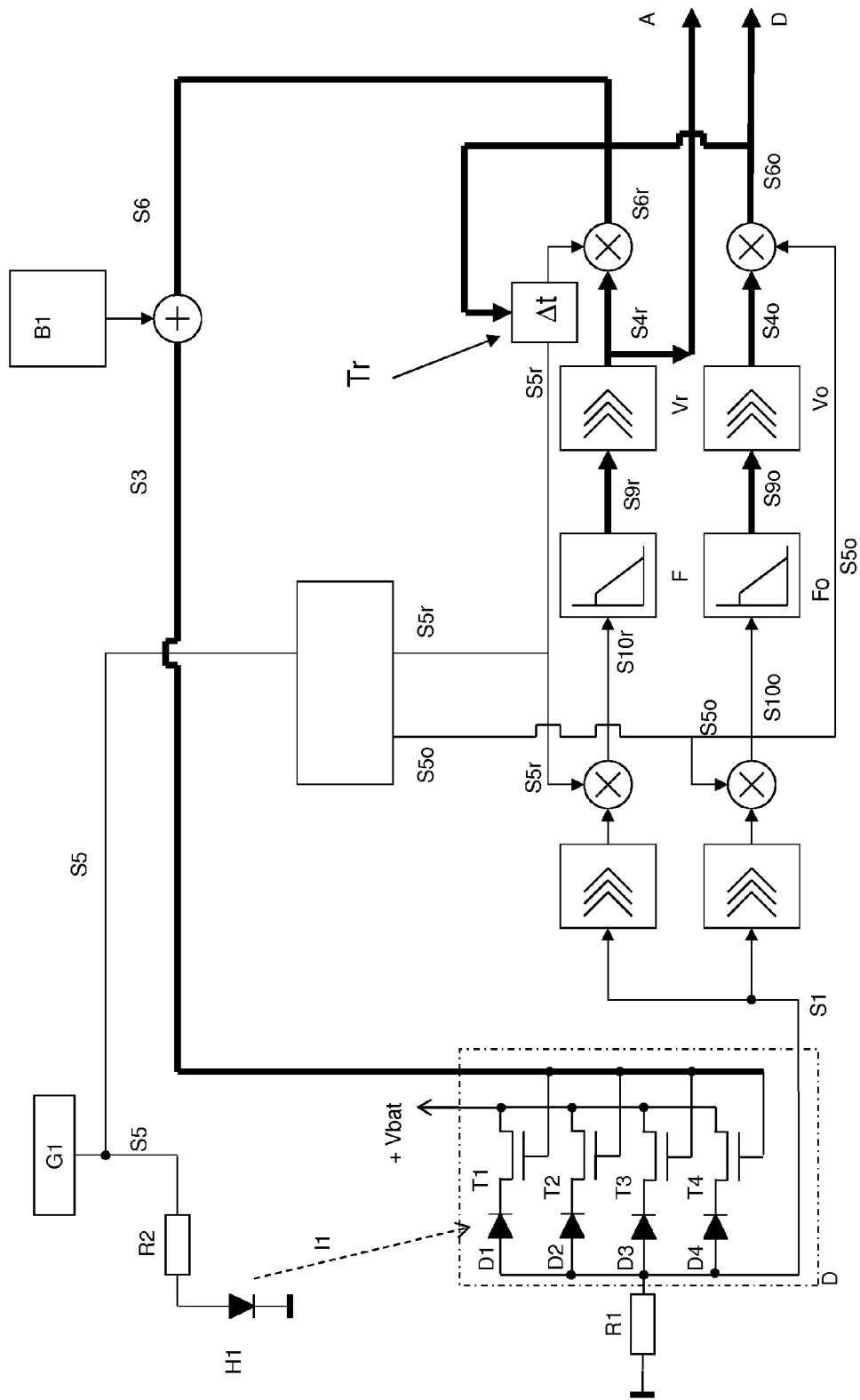
FIG. 7 is a schematic of a sixth illustrative embodiment of the invention.
Figure 8:
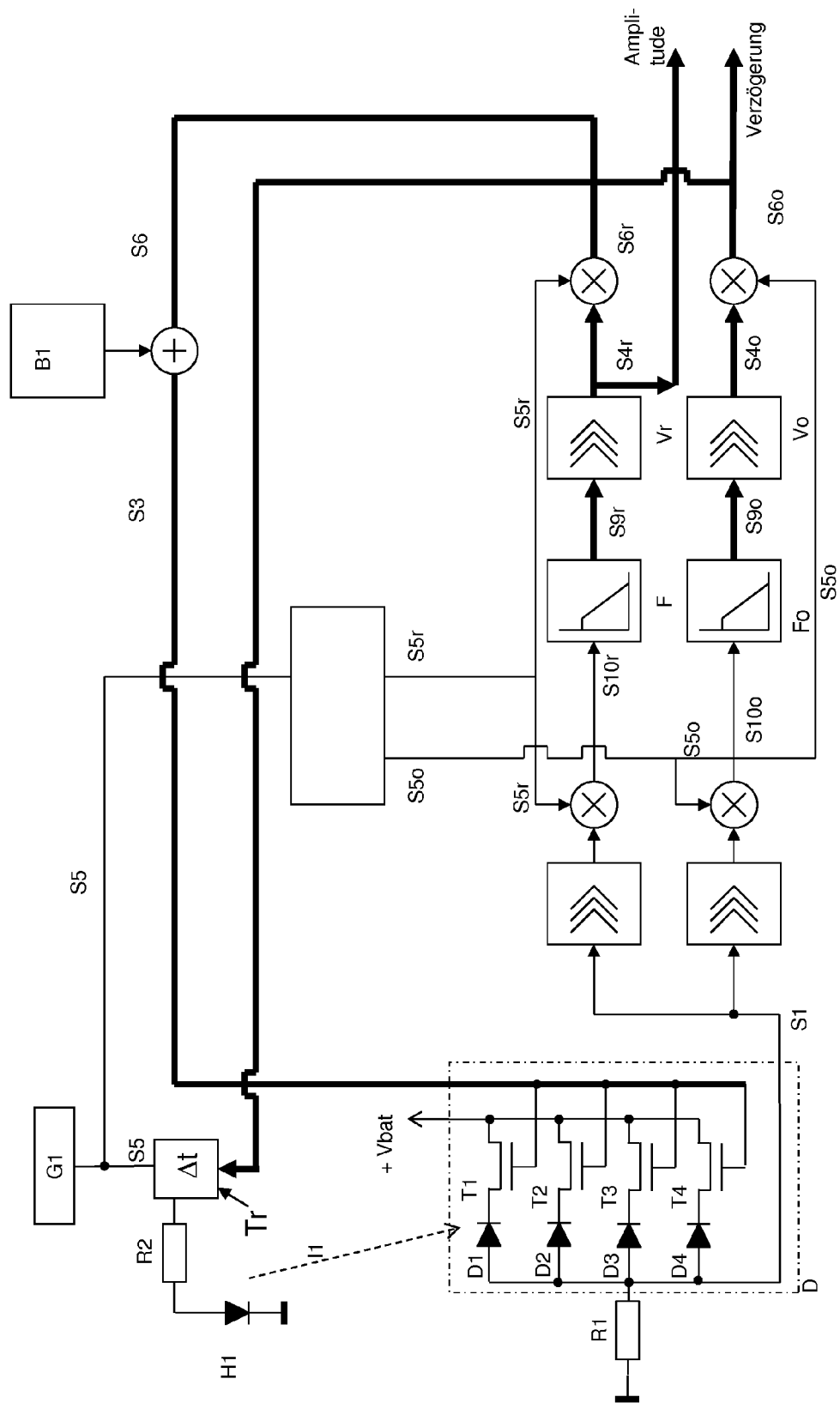
FIG. 8 is a schematic of a seventh illustrative embodiment of the invention.

Alternatively, the delay block TR delay may be located in the multiplication path of the signal S5r (FIG. 7) or in the transmitter path (FIG. 8). In this last case the block TR delay control is performed such that the delay is smaller if the signal S6o is smaller.

Figure 9:
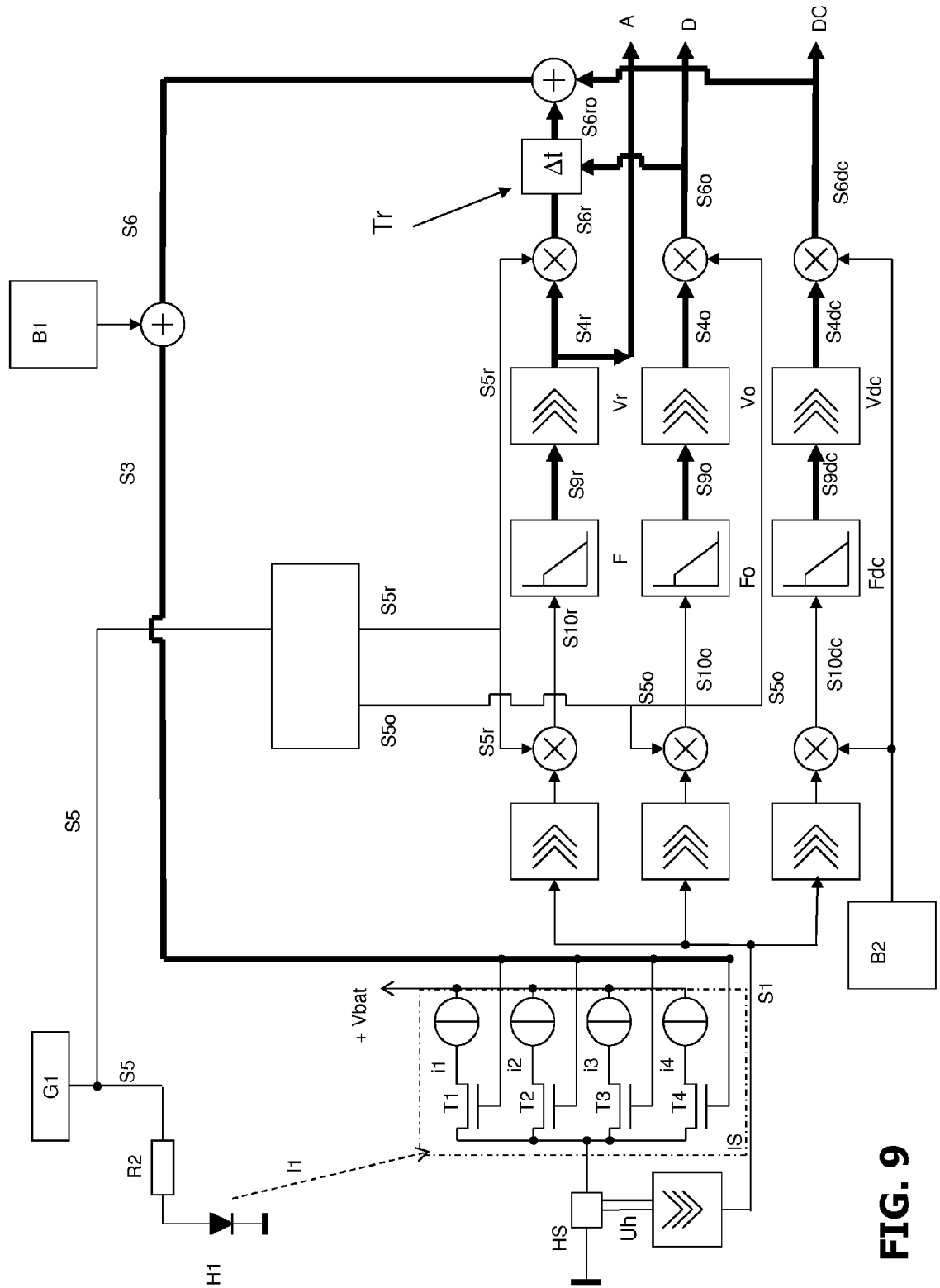
FIG. 9 is a schematic of an eighth illustrative embodiment of the invention.

In this regard, it is also understood that a combination of TR with further signals, for example the previously described DC compensation (FIG. 9), is possible. In this case B2 delivers a model of a jamming signal. This might also be a DC signal.

The receiver compensation system is not limited to photodiodes. The system may be applied to other types of receivers, e.g. hall detectors. The compensation transmitter signal S3 may be used for example to control a switchable current source IS. (FIG. 9) In this case the resultant current may be used as a supply for a hall sensor. A suitable amplifier/filter may transform the differential sensor signal Uh into the receiver output signal S1. The basic concept remains unchanged.

Figure 10:
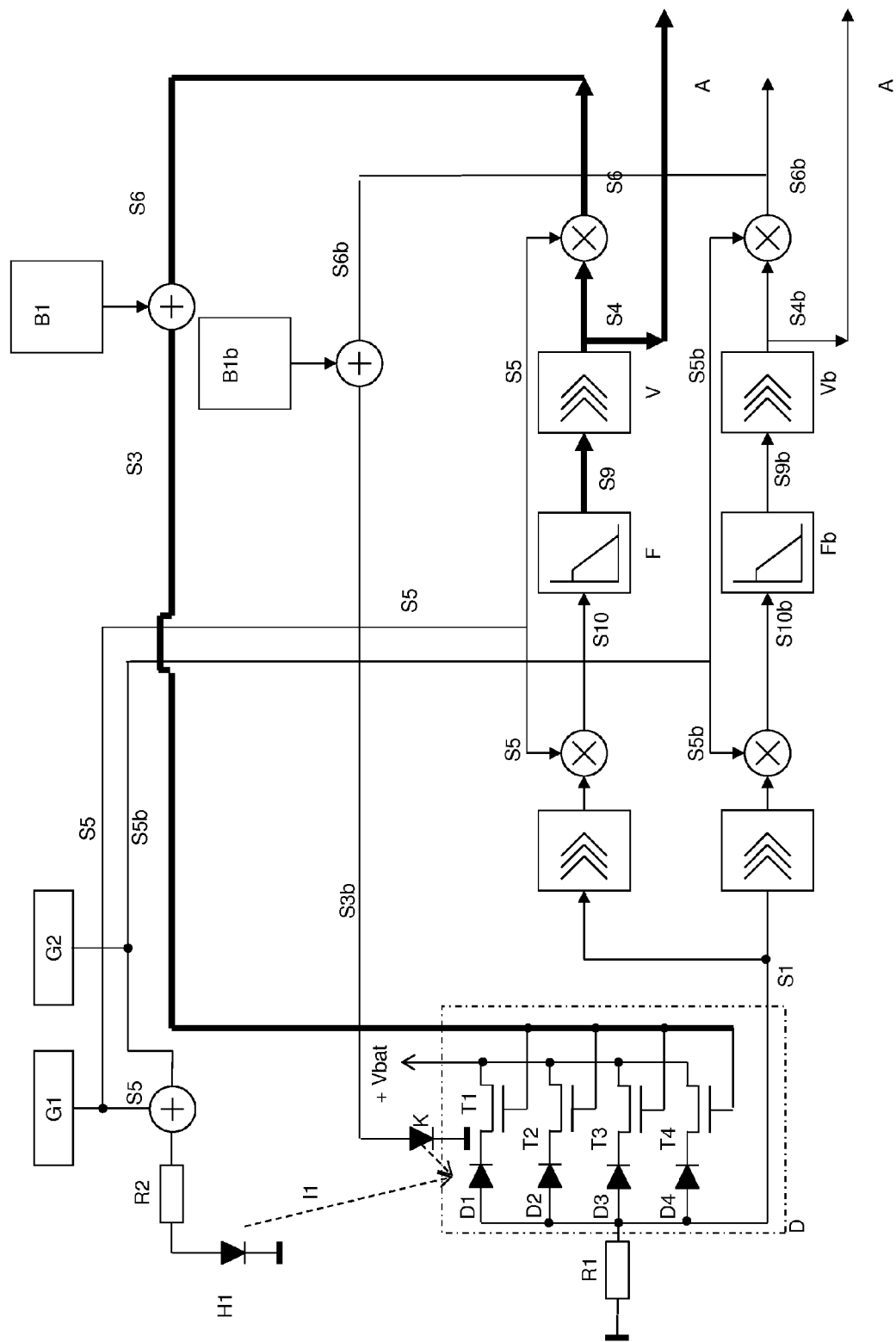
FIG. 10 is a schematic of a ninth illustrative embodiment of the invention.

Further it is possible (FIG. 10) to combine the control loop based on a signal S5 signal generator G1 as described before with a second control loop which is driven by a generator G2, wherein the control loop provides a compensation transmitter signal S3b to control a compensation transmitter K. The compensation transmitter K irradiates into the receiver D as well. In this manner, the signals of the transmitter H1 and the compensation transmitter K are superimposed at the input receiver D.

It is useful to choose fast time constants for this control loop. Typically the filter Fb and the frequency of the generator G2 define these time constants. This means that the S5b frequency should be higher than the S5 signal frequency and that the filter Fb should be faster than the filter F. The filter F and the generator G1 determine the sensitivity time constants. These time constants are chosen to be slower.

The frequencies and signal properties respectively of the generators G1 and G2 and of the corresponding signals S5 and S5b and the filter properties of the filters F and Fb must be chosen such that each of the filters F and Fb would filter a virtual product of the signals S5 and S5b to zero. As used in this disclosure, virtual product means that the multiplication of the two signals would result in a new signal. Because this multiplication is not performed, this product is named "virtual". This means that the two transmission signals S5 and S5b must be chosen to be orthogonal regarding a filtering by the filters F and Fb. This is equivalent to the condition that the product out of S5 and S5b must be reduced to zero by both filters F and Fb. In contrast to this a DC value passes both filters.

Figure 11:
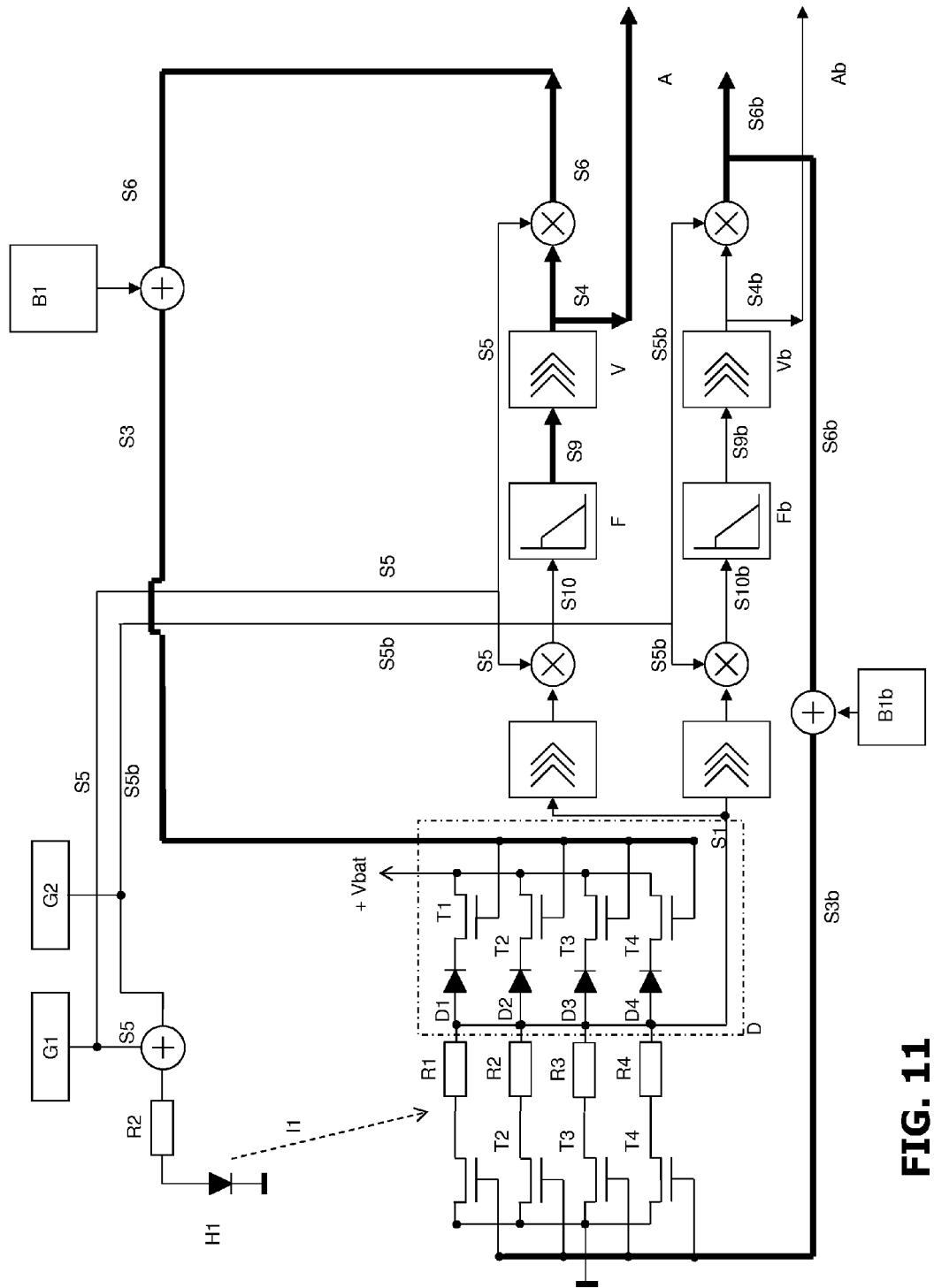
FIG. 11 is a schematic of a tenth illustrative embodiment of the invention.

Two control mechanisms may be also implemented in parallel. FIG. 11 shows such an embodiment. Again two generators G1 and G2 produce two orthogonal signals S5 and S5b. The orthogonality refers to the virtual product of these two signals S5 and S5b and the subsequent filtering by one of the respective filters F and Fb. Each of the filters transforms the virtual product to zero. In contrast to the preceding embodiments, this embodiment illustrates two control loops, each of which affects the receiver independently.

The first control loop is operated using the signal S5. In this loop, the receiver output signal S1 is multiplied by the generator output signal S5 to generate the filter F input signal S10. The filter F generates the filter output signal S9 from the filter input signal S10. The filter output signal S9 is amplified to generate the output signal S4, which represents the result. The output signal S4 is multiplied with the transmitter signal S5 to obtain the compensation pre-signal S6. The compensation pre-signal S6 is modified with an optional offset B1 to generate the compensation signal S3. In this example the compensation signal S3 controls the segmentation of the photodiode, which is the receiver D.

The second control loop is operated using the signal S5b. It generates the filter input signal S10b by multiplying the receiver output signal S1 with the signal S5b generated by the generator G2. The filter Fb receives the filter input signal S10$b$ and generates the filter output signal S9$b$. The filter output signal S9$b$ is amplified to generate the output signal S4$b$, which represents the result. The output signal S4$b$ is multiplied with the transmitter signal S5$b$ to generate the compensation pre-signal S6$b$. The compensation pre-signal S6$b$ is modified with an optional offset B1$b$ to generate the compensation signal S3$b$.

In this example the compensation signal S3$b$ additionally controls the segmentation of the sense resistor. Both channels independently deliver a measurement result. This control method changes the differential input sensitivity of the sensor. This example illustrates an embodiment wherein both the differential sensitivity and the operating point of the system are controlled.

Figure 12:
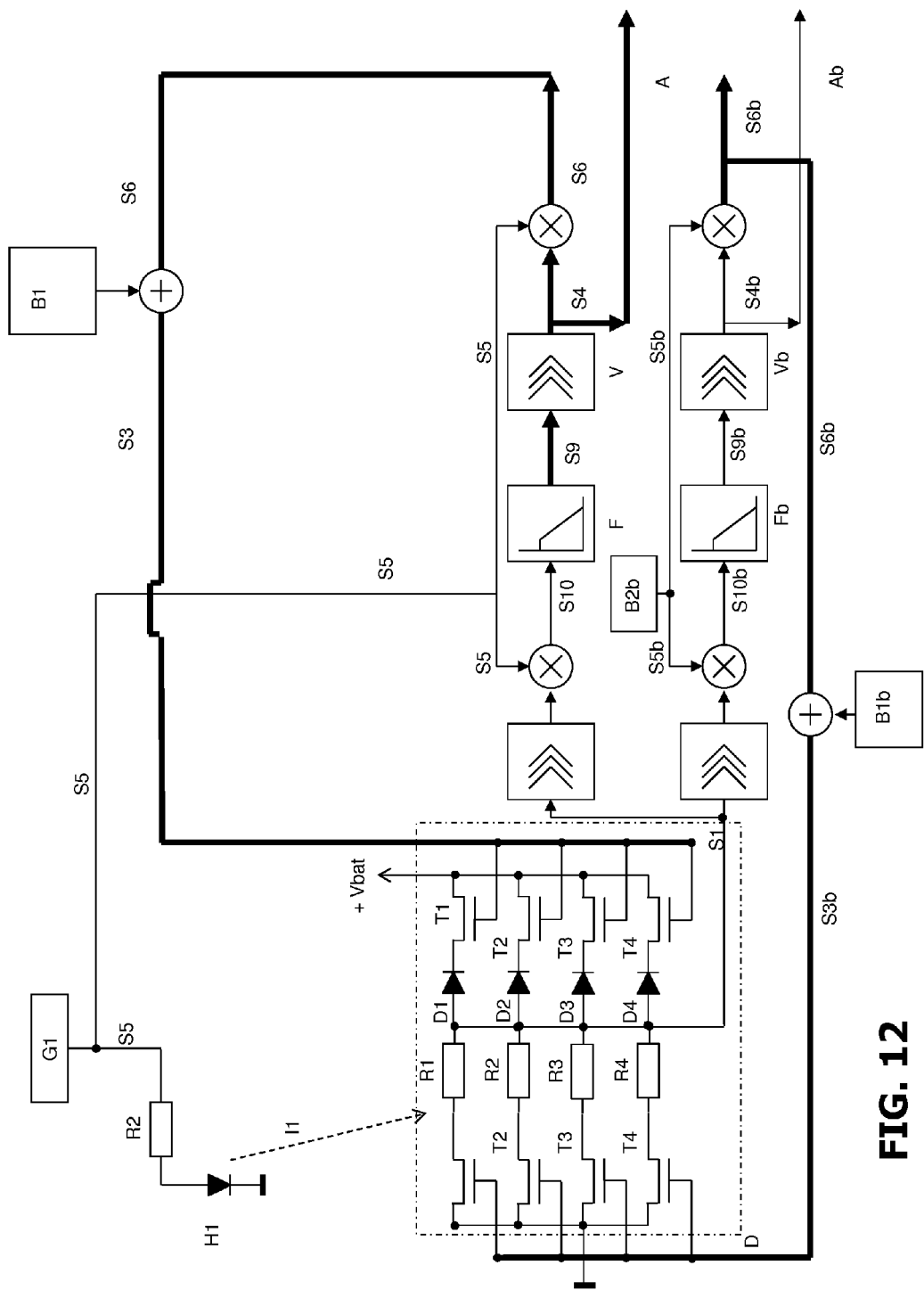
FIG. 12 is a schematic of an eleventh illustrative embodiment of the invention.

FIG. 12 shows a circuit schematic similar to FIG. 11. Here signal S5$b$ is a DC signal. Therefore this circuit might be used to compensate for a DC jamming signal. The multiplication is included in FIG. 12 for better understanding. Strictly speaking the multiplication in the DC path is not necessary and may be omitted.

Figure 13:
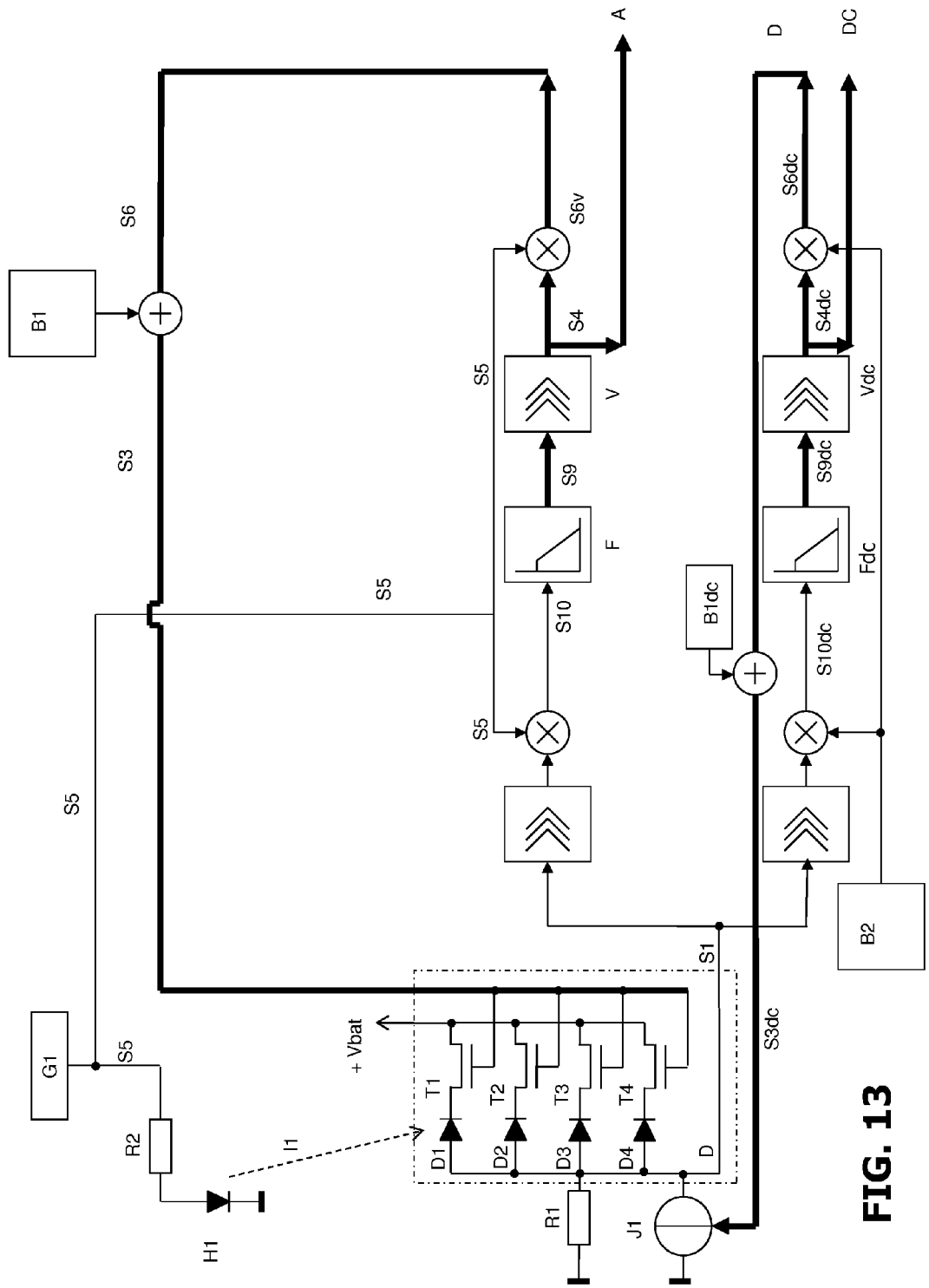
FIG. 13 is a schematic of a twelfth illustrative embodiment of the invention.

FIG. 13 shows a construction that is similar to the embodiment of FIG. 12. In contrast to FIG. 12, however, a controllable current source is used instead of switchable resistors. The parameters of the control loop are named with the index dc instead of the index b. They are named B1$dc$, S10$dc$, S9$dc$, S4$dc$, S6$dc$, and S3$dc$. The control method of this embodiment operates in a manner similar to the embodiment of the invention as described in conjunction with FIG. 11.

Figure 14:
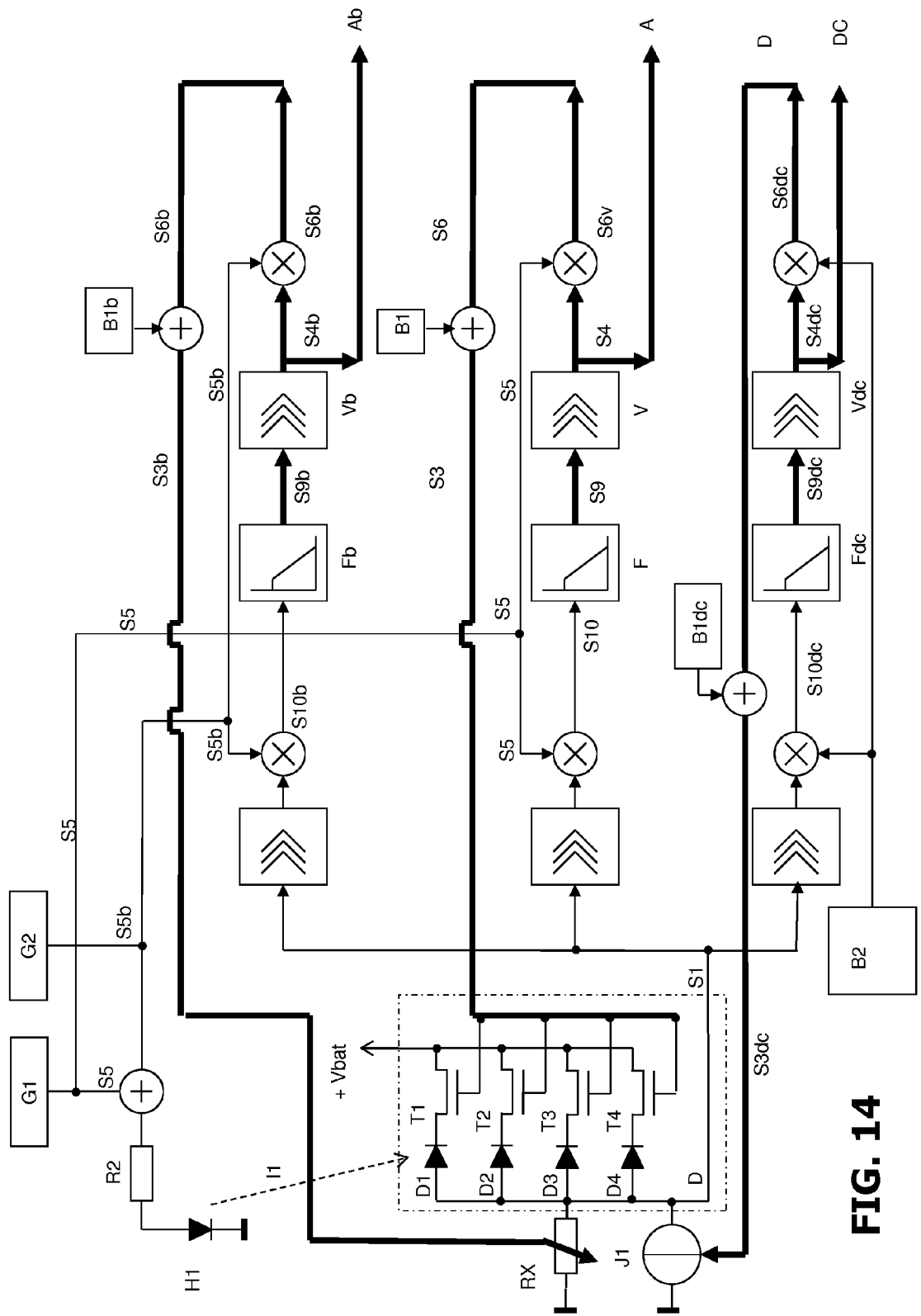
FIG. 14 is a schematic of a thirteenth illustrative embodiment of the invention.

For demonstration purposes FIG. 14 shows the combination of all three principles by three independent control loops. Again the generators G1 and G2 produce two orthogonal signals S5 and S5$b$. The bias-generator B2 acts as a quasi third generator G3. This third generator G3 produces a DC signal with a frequency 0 Hz. This signal is by definition orthogonal to S5 and S5$b$.

The explanation of the individual components was performed in the explanations of the components of the preceding figures. Therefore it is not required to repeat this explanation here. The system delivers three independent values.

A combination of one or more compensation transmitters is of course possible, within the scope of the invention. Furthermore, it is possible to use more than one transmitter H1. If orthogonality is ensured multiple control loops with multiple generators, transmitters, compensation transmitters etc. may be operated in parallel.

In the case of Hall-sensor-receivers transmitter coils might be used to act as transmitters and compensation transmitters.

The invention claimed is:

1. A method to operate a compensation sensor system comprising at least one receiver D and a first control loop, comprising:
   the at least one receiver D is readjusted in its sensitivity by a first control signal S3 such that,
   in the case of changes of one of a strength of a light signal and a strength of a magnetic field detected by the receiver D, the first control signal S3 of the first control loop resets a value of at least one associated receiver output signal S1 to substantially the value of the output signal S1 prior to the change, and
   at least a second control signal S4 of the first control loop represents a change of the one of the strength of the light signal and the strength of the magnetic field.

2. The method according to claim 1, wherein the at least one receiver D is a photodiode and the receiver D detects the light signal.

3. The method according to claim 1, wherein the at least one receiver D is a Hall sensor and the receiver D detects the magnetic field.

4. The method according to claim 1 wherein the at least one receiver D comprises an interconnection of multiple receivers configured to be connected and disconnected to perform a reception depending on the first control signal S3.

5. The method according to claim 1 wherein:
   a. at least one transmitter H1 irradiates at least one transmitter signal S5 onto the at least one receiver D,
   b. a feedback control of an absolute receiver sensitivity of said receiver D compensates via the first control signal S3 the irradiation of the transmitter H1 such that,
   c. the at least one receiver output signal S1 contains substantially no remaining portion of the transmitter signal S5.

6. The method according to claim 5 wherein the receiver D includes a Hall sensor having a differential receiver sensitivity, and
   a. at least one transmitter H1 irradiates at least one transmitter signal S5 onto the at least one receiver D,
   b. a feedback control of the differential sensitivity of the receiver D compensates via the first control signal S3 the irradiation of the transmitter H1 such that,
   c. the at least one receiver output signal S1 contains substantially no remaining portion of the transmitter signal S5.

7. The method according to claim 6, wherein the sensor system further comprises a second control loop and the second control loop keeps the differential receiver sensitivity substantially constant.

8. The method according to claim 1, wherein:
   at least one compensation transmitter K irradiates an additional signal S3$b$ onto the at least one receiver D,
   a third control loop and the additional signal S3$b$ control the compensation transmitter K, and
   the control signal S3$b$ depends on the receiver output signal S1.

9. A compensated sensor system comprising at least one receiver D and a first control loop, wherein:
   the at least one receiver D is readjusted in its sensitivity,
   in case of changes of a one of a strength of a light signal and a strength of a magnetic field detected by said receiver D the control loop resets a value of at least one related receiver output signal S1 to substantially the value of the output signal S1 prior to the change, by the first control loop using at least one control signal S3, and
   a second control signal S4 of the first control loop represents the change of the one of the strength of the light signal and the strength of the magnetic field.

10. A method of operating a compensation sensor system comprising at least one receiver and a first control loop, said method including the steps of:
   receiving one of a light signal and a magnetic field signal at a first strength level by the receiver,
   adjusting the sensitivity of the receiver via a first control signal such that a receiver output signal is at a first receiver output signal value,
   receiving the one of the light signal and magnetic field signal at a second strength level by the receiver, the second level being different from the first level, and
   readjusting the sensitivity of the receiver via the first control signal such that the receiver output signal is adjusted to substantially the first receiver output signal value, and
   a control loop output signal represents a measurement of a difference between the first level and the second level of the variable receiver input signal.

11. The method according to claim 10, wherein the at least one receiver is a photodiode.

12. The method according to claim 10, wherein the at least one receiver is a hall sensor.

13. The method according to claim 10, wherein the at least one receiver comprises an interconnection of multiple sub-receivers, said multiple sub-receivers configured to be connected and disconnected in order to adjust the sensitivity of the receiver, said multiple sub-receivers being connected and disconnected according to the first control signal.

14. The method according to claim 10, wherein:
a transmitter generates the one of the light signal and magnetic field signal based on a transmitter input signal, and
an absolute receiver sensitivity of the receiver compensates, via the first control signal, the one of the light signal and magnetic field signal such that the receiver output signal contains substantially no remaining portion of the variable receiver input signal.

15. The method according to claim 10, wherein the compensation sensor system further comprises a second control, and the second control loop keeps the differential receiver sensitivity substantially constant.

16. The method according to claim 10, wherein:
at least one compensation transmitter irradiates a compensating receiver input signal onto the receiver based on a compensation transmitter input signal,
a third control loop controls the compensation transmitter via the compensation transmitter input signal, and
the compensation transmitter input signal depends on the receiver output signal.

* * * * *